United States Patent
Yang et al.

(10) Patent No.: US 12,086,294 B2
(45) Date of Patent: Sep. 10, 2024

(54) VOLTAGE ATTACK DETECTION CIRCUIT AND CHIP

(71) Applicant: SHENZHEN GOODIX TECHNOLOGY CO., LTD., Guangdong (CN)

(72) Inventors: Jiang Yang, Guangdong (CN); Jianfeng Xue, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 148 days.

(21) Appl. No.: 17/490,178

(22) Filed: Sep. 30, 2021

(65) Prior Publication Data

US 2022/0019701 A1 Jan. 20, 2022

Related U.S. Application Data

(63) Continuation of application No. PCT/CN2020/082828, filed on Apr. 1, 2020.

(51) Int. Cl.
*G06F 21/75* (2013.01)
*G06F 21/55* (2013.01)
(Continued)

(52) U.S. Cl.
CPC .......... *G06F 21/755* (2017.08); *G06F 21/554* (2013.01); *G06F 21/85* (2013.01); *H03K 17/22* (2013.01); *G01R 19/0084* (2013.01)

(58) Field of Classification Search
CPC ..... G06F 21/755; G06F 21/554; H03K 17/22; G01R 19/0084
See application file for complete search history.

(56) References Cited

U.S. PATENT DOCUMENTS

| 4,353,032 A | 10/1982 | Taylor |
| 7,620,823 B2 | 11/2009 | Kim |

(Continued)

FOREIGN PATENT DOCUMENTS

| CN | 1525392 A | 9/2004 |
| CN | 101089772 A | 12/2007 |

(Continued)

OTHER PUBLICATIONS

Yanci, A.G. et al., "Detecting Voltage Glitch Attacks on Secure Devices," 2008 Bio-inspired, Learning and Intelligent Systems for Security (Aug. 4, 2008), pp. 75-80.

(Continued)

*Primary Examiner* — Ellen Tran
(74) *Attorney, Agent, or Firm* — Scully, Scott, Murphy & Presser, P.C.

(57) ABSTRACT

A voltage attack detection circuit includes: at least one voltage regulation circuit, where the at least one voltage regulation circuit is connected to an external supply respectively, the at least one voltage regulation circuit is configured to convert the external supply to at least one internal supply, and the at least one internal supply is configured to output at least one first voltage respectively; at least one voltage sensor, where the at least one voltage sensor is connected to the at least one internal supply respectively, so as to receive the at least one first voltage respectively, each voltage sensor of the at least one voltage sensor is configured to output a reference voltage based on a received reference voltage and a received first voltage, the reference voltage is configured to indicate whether a received first voltage is within a present voltage range.

20 Claims, 1 Drawing Sheet

(51) Int. Cl.
*G06F 21/85* (2013.01)
*H03K 17/22* (2006.01)
*G01R 19/00* (2006.01)

(56) References Cited

U.S. PATENT DOCUMENTS

| | | | |
|---|---|---|---|
| 9,941,880 B1* | 4/2018 | Lesea | H03K 19/003 |
| 10,726,122 B2 | 7/2020 | Regner et al. | |
| 2004/0158728 A1 | 8/2004 | Kim | |
| 2006/0104001 A1* | 5/2006 | Yoshio | H02H 3/085 |
| | | | 361/103 |
| 2017/0053707 A1 | 2/2017 | Liao | |
| 2017/0054300 A1 | 2/2017 | Shao et al. | |
| 2018/0069874 A1 | 3/2018 | Saeki et al. | |
| 2019/0005269 A1* | 1/2019 | Regner | H03K 19/17768 |
| 2019/0303624 A1* | 10/2019 | Moss | H04L 9/003 |

FOREIGN PATENT DOCUMENTS

| | | |
|---|---|---|
| CN | 101267194 A | 9/2008 |
| CN | 101943728 A | 1/2011 |
| CN | 103034804 A | 4/2013 |
| CN | 103036823 A | 4/2013 |
| CN | 203983986 U | 12/2014 |
| CN | 104459564 A | 3/2015 |
| CN | 104850805 A | 8/2015 |
| CN | 107462827 A | 12/2017 |
| CN | 107531200 A | 1/2018 |
| CN | 107765752 A | 3/2018 |

OTHER PUBLICATIONS

Gomina, K. et al., "Power supply glitch attacks: Design and evaluation of detection circuits," 2014 IEEE International Symposium on Hardware-Oriented Security and Trust (HOST) (May 6, 2014), pp. 136-141.

* cited by examiner

VOLTAGE ATTACK DETECTION CIRCUIT AND CHIP

CROSS REFERENCE TO RELATED APPLICATIONS

The present application is a continuation of international application No. PCT/CN2020/082828, filed on Apr. 1, 2020, which is hereby incorporated by reference in its entirety.

TECHNICAL FIELD

An embodiment of the present application relates to the field of electronics, and in particular, to a voltage attack detection circuit and a chip.

BACKGROUND

With the widespread popularity of mobile payments and transactions, electronic devices are increasingly used to store, process, and transmit data containing key information. For example, a security chip can be used to implement functions such as user identification and key data storage, and it is widely applied in the financial field. As a foundation of security hardware, the security chip plays an essential role in information security. In recent years, more and more chip-level attack methods and instances have been disclosed, and accordingly, higher and higher requirements are put forward for chip-level security.

There are many ways of chip-level attacks, among which error injection attack is the most effective. The purpose of the error injection attack is to force the chip to perform an abnormal operation, thereby causing the security information in the chip to be exposed. At this point, an attacker can easily obtain confidential data in the security chip by using fault analysis technology. There are many ways of the error injection attacks, such as voltage attacks, temperature attacks, laser attacks, electromagnetic attacks and the like.

For voltage attacks, by changing a supply voltage of a power domain of the chip, a circuit inside the chip is made to work abnormally, thereby causing a trigger to enter an error state, causing a processor to skip or perform a wrong operation, so that the security information in the chip is exposed.

In general, inside of the chip is divided into a plurality of different power domains. Although each power domain is independent, there are certain dependencies and interactions between them. Therefore, each power domain must be protected. In other words, the chip needs to be built with a complete protection solution to against voltage attacks in the whole power domain.

SUMMARY

An embodiment of the present application is provided with a voltage attack detection circuit and a chip, which can provide voltage attack protection for the whole power domain.

In a first aspect, a voltage attack detection circuit is provided, including:

at least one voltage regulation circuit, where the at least one voltage regulation circuit is connected to an external supply respectively, the at least one voltage regulation circuit is configured to convert the external supply to at least one internal supply, and the at least one internal supply is configured to output at least one first voltage respectively;

at least one voltage sensor, where the at least one voltage sensor is connected to the at least one internal supply respectively, to receive the at least one first voltage respectively, each voltage sensor of the at least one voltage sensor is configured to output a first signal based on received reference voltage and received first voltage, and the first signal is configured to indicate whether the received first voltage is within in a preset voltage range.

Through the at least one voltage sensor, the at least one first voltage output by the at least one voltage regulation circuit can be protected from voltage attacks respectively, that is, the whole power domain can be protected from voltage attacks.

In some possible implementation manners, a maximum value of the preset voltage range is less than a maximum working voltage of a bandgap voltage reference, and a minimum value of the preset voltage range is greater than a minimum working voltage of the bandgap voltage reference.

When the circuit is working normally, the maximum value of the preset voltage range is constructed to be less than the maximum working voltage of the bandgap voltage reference, and the minimum value of the preset voltage range is constructed to be greater than the minimum working voltage of the bandgap voltage reference, the probability of false alarm may be reduced as much as possible, so as to improve user experience.

In some possible implementation manners, the voltage attack detection circuit further includes:

a reference voltage generation circuit and a reference voltage detection circuit;

where the reference voltage generation circuit is configured to generate the reference voltage, the reference voltage detection circuit is connected to the reference voltage generation circuit, the reference voltage detection circuit is configured to receive the reference voltage and output an indication signal, and the indication signal is configured to indicate whether the reference voltage is abnormal.

Through the reference voltage detection circuit, false alarm caused by the abnormality of the reference voltage can be avoided, so as to improve the accuracy of voltage attack alarm.

In some possible implementation manners, the voltage attack detection circuit further includes:

a deglitch circuit;

where the reference voltage detection circuit is connected to the at least one voltage sensor through the deglitch circuit respectively, the deglitch circuit is configured to reset a first indication signal of a duration less than or equal to a preset threshold to a second indication signal, the first indication signal is configured to indicate that the reference voltage is abnormal, and the second indication signal is configured to indicate that the reference voltage is not abnormal.

In the case of a glitch in the reference voltage, the deglitch circuit can ensure the accuracy of the indication signal.

Accordingly, the accuracy of the voltage attack alarm can be ensured. In other words, through the deglitch circuit, the voltage attack circuit can also correctly indicate whether the at least one first voltage is under attack when there is a glitch in the reference voltage, so as to remind the user to pay attention to safety protection or take security measures when the supply voltage is under attack.

In some possible implementation manners, each voltage sensor of the at least one voltage sensor is further configured to receive the indication signal, such that each voltage sensor of the at least one voltage sensor outputs the first signal according to a received indication signal.

In some possible implementation manners, if the indication signal is configured to indicate that the reference voltage is abnormal, the first signal is configured to indicate that the received first voltage is within the preset voltage range.

In some possible implementation manners, the voltage attack detection circuit further includes:
an external supply voltage sensor;
where the external supply voltage sensor is connected to the external supply, the external supply is configured to output a second voltage, the external supply voltage sensor is configured to receive the second voltage and the reference voltage and output a second signal, and the second signal is configured to indicate whether the second voltage is within the preset voltage range.

On the basis of performing voltage attack protection on the at least one internal supply, the external supply voltage sensor can be configured to perform voltage attack protection for the external supply.

In some possible implementation manners, each voltage regulation circuit of the at least one voltage regulation circuit includes at least one of following elements: a low dropout regulator, a charge pump, a BUCK converter, a Boost converter and a bidirectional Direct current-Direct current converter.

In some possible implementation manners, each voltage sensor of the at least one voltage sensor includes a hysteresis comparator.

In a second aspect, a chip is provided, including:
a power management unit; and
the voltage attack detection circuit according to the first aspect or any possible implementation manners of the first aspect, where the power management unit is connected to the voltage attack detection circuit, and the voltage attack detection circuit is configured to detect whether a supply voltage of the power management unit is under voltage attack.

DESCRIPTION OF EMBODIMENTS

The following describes the technical solutions in the embodiments of the present application with reference to the accompanying drawings.

Figure 1:
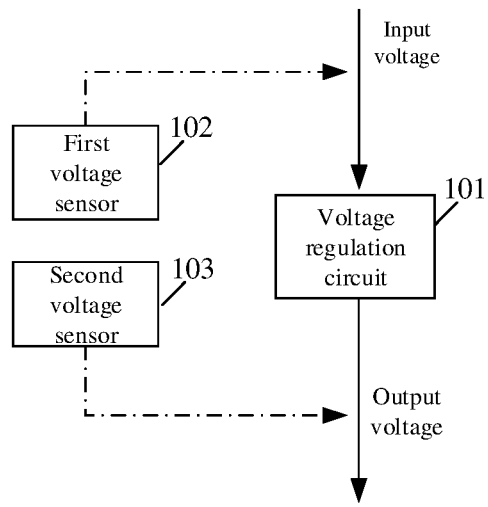
FIG. 1 is a schematic structure diagram of the positional relationship between a voltage sensor and a voltage regulation circuit according to an embodiment of the present application.

FIG. 1 is a schematic structure diagram of the positional relationship between a voltage sensor and a voltage regulation circuit according to an embodiment of the present application.

As shown in FIG. 1, a chip 100 has a plurality of power domains (that is, internal supply). For example, a voltage regulation circuit 101 (Voltage Regulator) converts an input voltage into an output voltage, and supplies power to other modules. When the chip contains a plurality such voltage regulation circuits, complex and diverse power domains are formed, and each power domain needs a voltage sensor 102 or 103 to detect whether it is under voltage attack.

Figure 2:
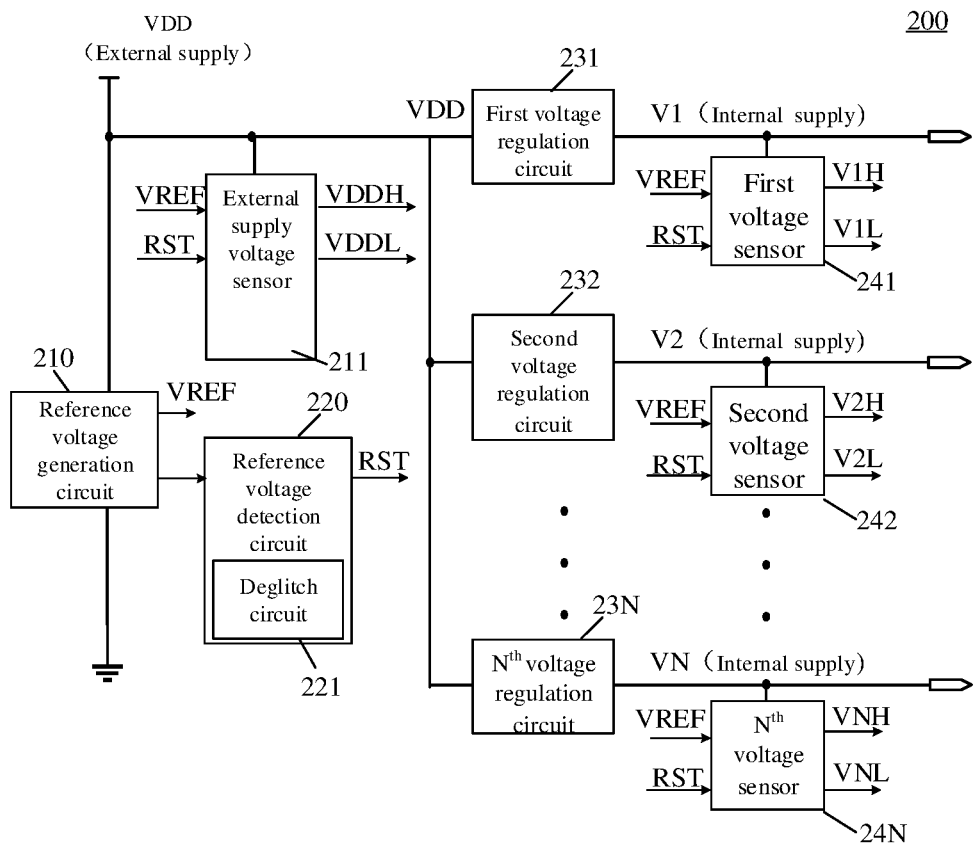
FIG. 2 is a schematic structure diagram of a voltage attack detection circuit of an embodiment of the present application.

FIG. 2 is a schematic structure diagram of a voltage attack detection circuit 200 of an embodiment of the present application.

As shown in FIG. 2, the voltage attack detection circuit 200 may include at least one voltage regulation circuit, for example, the at least one voltage regulation circuit may include a first voltage regulation circuit 231 and a second voltage regulation circuit 232, . . . , and an $N^{th}$ voltage regulation circuit 23N, as shown in FIG. 2. The at least one voltage regulation circuit is connected to an external supply (VDD) respectively, the at least one voltage regulation circuit is configured to convert the external supply to at least one internal supply, and the at least one internal supply is configured to output at least one first voltage respectively, for example, the at least one internal supply may include internal power supplies V1, V2, . . . , and VN, as shown in FIG. 2. Each of the at least one internal supply can supply power to different devices or modules in the chip. The voltage attack detection circuit 200 may further include at least one voltage sensor, for example, the at least one voltage sensor may include a first voltage sensor 241, a second voltage sensor 242, . . . , and an $N^{th}$ voltage sensor, as shown in FIG. 2; where the at least one voltage sensor is connected to the at least one internal supply respectively, to receive the at least one first voltage respectively, each voltage sensor of the at least one voltage sensor is configured to output a first signal based on a received reference voltage VREF and a received first voltage, and the first signal is configured to indicate whether the received first voltage is within a preset voltage range.

In other words, the at least one voltage sensor outputs at least one first signal respectively, and the at least one first signal is configured to indicate whether the at least one first voltage is within a preset voltage range respectively.

It should be noted that each first signal of the at least one first signal may include a first signal component and a second signal component.

For example, the at least one first signal may include at least one first signal component, for example, the at least one first signal component may include V1H, V2H, . . . , VNH and at least one second signal component as shown in FIG. 2, for example, the at least one second signal component may include V1L, V2L, . . . , and VNL as shown in FIG. 2. For example, the at least one first signal component may be configured to indicate whether the at least one first voltage is greater than or equal to a maximum value of the preset voltage range respectively, and the at least one second signal component may be configured to indicate whether the at least one first voltage is less than or equal to a minimum value of the preset voltage range.

For example, as shown in FIG. 2, in the voltage attack detection circuit 200, the first voltage regulation circuit 231, the second voltage regulation circuit 232, . . . , and the $N^{th}$ voltage regulation circuit 23N divide the external supply domain VDD into a plurality of internal supply domains V1-VN, where each internal supply domain is connected to a voltage sensor. When the voltage of any one of the internal supply domains is greater than the preset voltage range (that is, safety range) set by the voltage sensor, a high voltage alarm signal is output, and when it is below the safety range, a low voltage alarm signal is output. For example, the first voltage regulation circuit 231 converts the external supply VDD into the internal supply V1. When V1 is greater than the safety range set by the first voltage sensor 241, V1H is changed to high level (logic "1"), that is, a high voltage alarm signal is output; and when V1 is lower than the safety range set by the first voltage sensor 241, V1L is changed to high level (logic "1"), that is, a low voltage alarm signal is output.

In other words, each voltage sensor of the at least one voltage sensor may be configured to receive a first voltage and a first reference voltage and output a first signal component, the first signal component is configured to indicate whether the first voltage is greater than or equal to the first reference voltage. Each voltage sensor of the at least one voltage sensor may also be configured to receive a first voltage and a second reference voltage and output a second signal component, the second signal component is configured to indicate whether the first voltage is less or equal to the second reference voltage. Here, a voltage value of the first reference voltage is greater than a voltage value of the second reference voltage.

Through the at least one voltage sensor, the at least one first voltage output by the at least one voltage regulation circuit can be protected from voltage attacks, that is, the whole power domain can be protected from voltage attacks.

In some embodiments of the present application, a maximum value of the preset voltage range (that is, an upper limit value of the present voltage range) is less than a maximum working voltage of the bandgap voltage reference, and a minimum value of the preset voltage range (that is, a lower limit of the preset voltage range) is greater than a minimum working voltage of the bandgap voltage reference.

For example, the maximum value of the preset voltage range is less than or equal to a voltage value of the first voltage when the supply voltage is the maximum working voltage of the bandgap voltage reference. The minimum value of the preset voltage range is greater than or equal to a voltage value of the first voltage when a voltage of the external supply is the minimum working voltage of the bandgap voltage reference.

When the circuit is working normally, the maximum value of the preset voltage range is constructed to be less than the maximum working voltage of the bandgap voltage reference, and the minimum value of the preset voltage range is constructed to be greater than the minimum working voltage of the bandgap voltage reference, the probability of false alarm may be reduced as much as possible, so as to improve user experience.

Specifically, the bandgap voltage reference may also be referred to as a bandgap voltage reference circuit, and the bandgap voltage reference may be configured to convert the external supply (VDD) to working voltages of some or all of the devices in the voltage attack detection circuit 200. In other words, the VDD may be used as the working voltage of the bandgap voltage reference, so that the bandgap voltage reference may output the working voltages for some or all of the devices in the voltage attack detection circuit 200 based on the VDD. The working voltage of the bandgap voltage reference may be a range value. The working voltage of the bandgap voltage reference may also be a preset value. The magnitude of the working voltage of the bandgap voltage reference depends on the magnitude of the VDD. For example, the VDD may be directly used as the working voltage of the bandgap voltage reference.

When determining whether a target voltage regulation circuit (that is, the target internal supply) of the at least one voltage regulation circuit has high voltage abnormity, if the working voltage of the bandgap voltage reference is at the maximum working voltage, since the working voltage of the bandgap voltage reference is provided by the VDD and its magnitude depends on the magnitude of the VDD, therefore, the voltage values of the VDD and the target internal supply (that is, a target first voltage output by the target internal supply) will also reach the maximum value, which is equivalent to that the first signal component formed by comparing the maximum value of the target first voltage with the first reference voltage is configured to indicate whether the target internal supply is in an abnormal high voltage state. Thus, the accuracy of the first signal component can be increased.

Similarly, when determining whether the target voltage regulation circuit (that is, the target internal supply) of the at least one voltage regulation circuit has low voltage abnormity, if an output voltage of the bandgap voltage reference (that is, the second reference voltage) reaches the minimum value, the VDD and the target first voltage can also reach the minimum value, which is equivalent to that the second signal component formed by comparing the minimum value of the target first voltage with the second reference voltage is configured to indicate whether the target internal supply is in an abnormal low voltage state. Thus, the accuracy of the second signal component can be increased.

As shown in FIG. 2, in some embodiments of the present application, the voltage attack detection circuit 200 may further include a reference voltage generation circuit 210 and a reference voltage detection circuit 220.

Here, the reference voltage generation circuit 210 is configured to generate the reference voltage, the reference voltage detection circuit 220 is connected to the reference voltage generation circuit 210, the reference voltage detection circuit 220 is configured to receive the reference voltage and output an indication signal, and the indication signal is configured to indicate whether the reference voltage is abnormal.

It should be noted that a reference signal used by the at least one voltage sensor is the same reference signal, to optimize the circuit structure. For example, the reference voltage generation circuit 210 may be configured to generate one first reference voltage and one second reference voltage, and the at least one voltage sensor corresponds to the one first reference voltage and the one second reference voltage. Of course, the at least one voltage sensor may also use different reference voltages. For example, the reference voltage generation circuit 210 may also be configured to generate at least one first reference voltage and at least one second reference voltage. For example, the at least one first reference voltage corresponds to the at least one voltage sensor respectively. For another example, the at least one second reference voltage corresponds to the at least one voltage sensor respectively.

Here, the reference voltage generation circuit 210 may be a bandgap voltage reference (Bandgap), that is, the reference voltage may be the working voltage of the bandgap voltage reference. For example, the bandgap voltage reference may be a sum of a voltage proportional to temperature and a voltage inversely proportional to the temperature, and temperature coefficients of the two cancel each other to achieve a temperature-independent reference voltage. For example, the bandgap voltage reference may be a direct current voltage that is independent from the supply and process and has a certain temperature characteristic. For example, the bandgap voltage reference may be about 1.25V. For another example, a reference voltage of the bandgap voltage reference may be approximate to a bandgap voltage of silicon.

Constructing the reference voltage to be a standard voltage can prevent the specific value of the reference voltage from changing with changes in temperature. Accordingly, It can accurately detect whether the voltage of the at least one internal supply (that is, the at least one first voltage) is lower than or exceeding the preset voltage range, and when the voltage of the at least one internal supply exceeds the preset voltage range, the user can be reminded that the power domain is under voltage attack.

However, when the power domain where the reference voltage is located is too high or too low, an accurate reference voltage will no longer be provided, and a false alarm will occur in all of the first signal.

In some embodiments of the present application, each voltage sensor of the at least one voltage sensor is further configured to receive the indication signal, such that each voltage sensor of the at least one voltage sensor output the first signal according to a received indication signal. For example, if the indication signal is configured to indicate that the reference voltage is abnormal, the first signal is configured to indicate that the received first voltage is within the preset voltage range.

In other words, the priority of the indication signal is higher than the priority of the determination result of the at least one first voltage.

In other words, when the indication signal is configured to indicate that the reference voltage is abnormal, even if the at least one first voltage is not within the preset voltage range, it is reset to indicate that the at least one first voltage is within the preset voltage range, and at this time, the first indication signal may also be referred to as a reset signal (RST). In other words, the reference voltage detection circuit 220 is not configured to output RST when the reference voltage is not abnormal, and is configured to output RST when the reference voltage is abnormal.

The working state of the reference voltage is monitored in real time by a reference voltage generation circuit with a reference voltage detection circuit, when the reference voltage works abnormally, the output signal of the at least one voltage sensor (that is, the at least one first signal) can be reset to indicate that the first voltage is within the preset voltage range, so as to avoid triggering a false alarm.

Since the reference voltage generation circuit 210 is connected to an external supply (VDD), and when the reference voltage generation circuit 210 is able to provide accurate reference voltage VREF to the at least one voltage sensor based on the external supply (VDD), and the indication signal is at high level (logic "1").

When the reference voltage generation circuit 210 works abnormally, that is, when the external supply VDD is too high or too low, so that the reference voltage VREF provided by the reference voltage generation circuit 210 to the at least one voltage sensor is no longer accurate, at this time, the indication signal is at low level (logic "0"), that is, the output of the at least one voltage sensor is at low level (logic "0"), that is, no alarm signal is sent out, which is equivalent to cause the alarm signal (the at least one first signal) output by the at least one voltage sensor to be invalidated, so as to avoid false alarm.

Through the reference voltage detection circuit 220, false alarm caused by the abnormality of the reference voltage can be avoided, so as to improve the accuracy of voltage attack alarm.

Of course, when the indication signal configured to indicate that the reference voltage is abnormal, the at least one first signal may also be configured to indicate that the at least one first voltage is not within the preset voltage range respectively, which is equivalent to that the indication signal is configured to warn the user that the external supply is under voltage attack. In other words, the reference voltage detection circuit 220 can not only indicate whether the at least one internal supply is under attack, but indicate whether the external supply is under attack, so as to remind the user to pay attention to safety protection or take security measures when at least one internal supply is under attack or the external supply is under attack.

As shown in FIG. 2, in some embodiments of the present application, the voltage attack detection circuit 200 further includes a deglitch circuit 221.

Here, the reference voltage detection circuit 220 is connected to the at least one voltage sensor through the deglitch circuit 221 respectively, the deglitch circuit 221 is configured to reset the first indication signal of a duration less than or equal to a preset threshold to a second indication signal, the first indication signal is configured to indicate that the reference voltage is abnormal, and the second indication signal is configured to indicate that the reference voltage is not abnormal.

For example, as shown in FIG. 2, the reference voltage generation circuit is configured to receive a CDD and output the VREF to an external supply voltage sensor and the reference voltage detection circuit, the reference voltage detection circuit 220 is configured to receive the VREF and output the indication signal, and the indication signal is configured to indicate whether the VREF is abnormal. Taking the indication signal output by the reference voltage detection circuit 220 as the first indication signal for indicating the abnormality of the VREF as an example, it is assumed that the duration of the first indication signal output by the reference voltage detection circuit 220 is less than or equal to the preset threshold, the deglitch circuit 221 generates and outputs the second instruction signal based on the first instruction signal transmitted by the reference voltage detection circuit 220. For example, if the logic "1" indicates that the VREF is abnormal and the reference voltage detection circuit 220 outputs the logic "1" with a duration less than or equal to a preset threshold, the deglitch circuit 221 outputs a logic "0", so that the first indication signal configured to indicate that the VREF is abnormal is reset to the second indication signal configured to indicate that the VREF is not abnormal.

It should be noted that, a glitch may be a regular or irregular pulse signal or spike signal included in an input waveform in a circuit. For example, a voltage value when there is a glitch in a positive direction of the reference voltage is equal to a voltage value when there is no glitch on the reference voltage plus a voltage value of the glitch. For another example, a voltage value when there is a glitch in a negative direction of the reference voltage is equal to a voltage value when there is no glitch on the reference voltage minus the voltage value of the glitch.

In other words, as for an unstable reference voltage, it can also be considered as a voltage of a stable reference voltage plus a glitch.

In the case of a glitch in the reference voltage, the deglitch circuit can prevent the instantaneous fluctuation of the reference voltage from causing frequent resets, and ensure the accuracy and reliability of the indication signal.

For example, during the power-on process, if there are instantaneous voltage fluctuations at the critical voltage that the reference voltage generation circuit can establish, the reference voltage detection circuit can sensitively detect such fluctuations, and accordingly, will frequently output the indication signal configured to indicate that the reference voltage is abnormal, then the circuit cannot continue to work normally. Through the deglitch circuit, the indication signal configured to indicate that the abnormality of the reference voltage for an instant period that is less than the specified duration can be reset to the indication signal configured to indicate that the reference voltage is not abnormal, so as to increase the accuracy and reliability of the indication signal.

Through the deglitch circuit, the voltage attack circuit can also correctly indicate whether the at least one first voltage is under attack when there is a glitch in the reference voltage, so as to remind the user to pay attention to safety protection or take security measures when the supply voltage is under attack, and accordingly the accuracy of the voltage attack alarm can be ensured.

As shown in FIG. 2, in some embodiments of the present application, the voltage attack detection circuit further includes an external supply voltage sensor 211.

Here, the external supply voltage sensor 211 is connected to the external supply, the external supply is configured to output a second voltage, the external supply voltage sensor is configured to receive the second voltage and the reference voltage, and output a second signal, and the second signal is configured to indicate whether the second voltage is within the preset voltage range. For example, the second voltage is the voltage of the external supply.

On the basis of performing voltage attack protection on the at least one internal supply, the external supply voltage sensor can be configured to perform voltage attack protection on the external supply.

In some embodiments of the present application, each voltage regulation circuit of the at least one voltage regulation circuit includes at least one of following elements: a low dropout regulator (LDO), a charge pump, a BUCK converter (BUCK), a Boost converter (Boost), and a bidirectional Direct current-Direct current converter (DC-DC converter), which can provide a voltage of stable output voltage.

In some embodiments of the present application, each voltage sensor of the at least one voltage sensor includes a hysteresis comparator.

The present application is further provided with a chip, including a power management unit and the voltage attack detection circuit described above; where the power management unit is connected to the voltage attack detection circuit, and the voltage attack detection circuit is configured to detect whether a supply voltage of the power management unit is under voltage attack.

In other words, the voltage attack detection circuit can be applied to any chip with a power management unit. For example, a security chip. For example, the security chip may be a fingerprint sensor chip or a processor chip, etc. The security chip is applicable for any kind of electronic device. For example, portable or mobile computing devices such as smart-phones, laptops, tablets and game devices, and other electronic devices such as electronic databases, automobiles and bank automated teller machines (ATM).

Those of ordinary skill in the art may be aware that, units and algorithm steps of the examples described in the embodiments disclosed herein may be implemented by an electronic hardware, or a combination of computer software and computer software. Whether the functions are executed by hardware or software depends on particular applications and design constraints of the technical solutions. Those skilled may implement the described functions by using different methods for each specific application, but this implementation should not be considered to be beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. From another point of view, the displayed or discussed mutual coupling or direct coupling or communication connection may be indirect coupling or communication connection via some interfaces, devices or units, and may be in electrical, mechanical or other forms.

The units described as separate parts may be or may not be separated physically, and a component displayed as a unit may be or may not be a physical unit, namely, may be located in one place, or may be distributed on a plurality of network units. Part of or all of the units here may be selected according to a practical need to achieve the objectives of the solutions of the embodiments of the present application.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solution of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present invention shall be subject to the protection scope of the claims.

What is claimed is:

1. A voltage attack detection circuit, comprising:
at least one voltage regulation circuit, wherein the at least one voltage regulation circuit is connected to an external supply respectively, the at least one voltage regulation circuit is configured to convert the external supply to at least one internal supply, and the at least one internal supply is configured to output at least one first voltage respectively;
a reference voltage generation circuit, wherein the reference voltage generation circuit is connected to the external supply and configured to generate a reference voltage according to the external supply;

a reference voltage detection circuit, wherein the reference voltage detection circuit is connected to the reference voltage generation circuit and configured to receive the reference voltage and output an indication signal, the indication signal is configured to indicate whether the reference voltage is abnormal;

at least one voltage sensor, wherein the at least one voltage sensor and the at least one voltage regulation circuit correspond one to one, each voltage sensor of the at least one voltage sensor is connected to a corresponding internal supply of the at least one internal supply respectively, to receive a corresponding first voltage of the at least one first voltage respectively, and each voltage sensor of the at least one voltage sensor is further connected to the reference voltage generation circuit and the reference voltage detection circuit, to receive the reference voltage and the indication signal;

each voltage sensor of the at least one voltage sensor is configured to output a first signal based on the reference voltage, the indication signal, and a received first voltage of the at least one first voltage;

if the indication signal indicates that the reference voltage is normal, the first signal is configured to indicate whether the received first voltage is within a preset voltage range based on the reference voltage and the indication signal, so as to generate voltage attack alarm;

if the indication signal indicates that the reference voltage is abnormal, the first signal is configured to indicate that the received first voltage is within the preset voltage range, so as to avoid false alarms.

2. The voltage attack detection circuit according to claim 1, wherein a maximum value of the preset voltage range is less than a maximum working voltage of a bandgap voltage reference, and a minimum value of the preset voltage range is greater than a minimum working voltage of the bandgap voltage reference.

3. The voltage attack detection circuit according to claim 1, wherein the voltage attack detection circuit further comprises:
a deglitch circuit;
wherein the reference voltage detection circuit is connected to the at least one voltage sensor through the deglitch circuit respectively, the deglitch circuit is configured to reset a first indication signal of a duration less than or equal to a preset threshold to a second indication signal, the first indication signal is configured to indicate that the reference voltage is abnormal, and the second indication signal is configured to indicate that the reference voltage is not abnormal.

4. The voltage attack detection circuit according to claim 1, wherein each voltage sensor of the at least one voltage sensor is further configured to receive the indication signal, such that each voltage sensor of the at least one voltage sensor outputs the first signal according to a received indication signal.

5. The voltage attack detection circuit according to claim 1, wherein the voltage attack detection circuit further comprises:
an external supply voltage sensor;
wherein the external supply voltage sensor is connected to the external supply, the external supply is configured to output a second voltage, the external supply voltage sensor is configured to receive the second voltage and the reference voltage and output a second signal, and the second signal is configured to indicate whether the second voltage is within the preset voltage range.

6. The voltage attack detection circuit according to claim 1, wherein each voltage regulation circuit of the at least one voltage regulation circuit comprises at least one of following elements: a low dropout regulator, a charge pump, a BUCK converter, a Boost converter and a bidirectional Direct current-Direct current converter.

7. The voltage attack detection circuit according to claim 1, wherein each voltage sensor of the at least one voltage sensor comprises a hysteresis comparator.

8. The voltage attack detection circuit according to claim 1, wherein the first signal comprises a first signal component and a second signal component, the first signal component is configured to indicate whether the first voltage is greater than or equal to a maximum value of the preset voltage range, and the second signal component is configured to indicate whether the first voltage is less than or equal to a minimum value of the preset voltage range.

9. The voltage attack detection circuit according to claim 1, wherein the reference voltage is a bandgap voltage reference, wherein the bandgap voltage reference is a sum of a voltage proportional to temperature and a voltage inversely proportional to the temperature, and temperature coefficients of the two cancel each other to achieve a temperature-independent reference voltage.

10. The voltage attack detection circuit according to claim 1, wherein the reference voltage is a bandgap voltage reference, and the bandgap voltage reference is a direct current voltage that is independent from the supply and process and has a certain temperature characteristic.

11. The voltage attack detection circuit according to claim 2, wherein the external supply is used as a working voltage of the bandgap voltage reference.

12. A chip, comprising:
a power management unit; and
a voltage attack detection circuit, comprising;
at least one voltage regulation circuit, wherein the at least one voltage regulation circuit is connected to an external supply respectively, the at least one voltage regulation circuit is configured to convert the external supply to at least one internal supply, and the at least one internal supply is configured to output at least one first voltage respectively;
a reference voltage generation circuit, wherein the reference voltage generation circuit is connected to the external supply and configured to generate a reference voltage according to the external supply;
a reference voltage detection circuit, wherein the reference voltage detection circuit is connected to the reference voltage generation circuit and configured to receive the reference voltage and output an indication signal, the indication signal is configured to indicate whether the reference voltage is abnormal;
at least one voltage sensor, wherein the at least one voltage sensor and the at least one voltage regulation circuit correspond one to one, each voltage sensor of the at least one voltage sensor is connected to a corresponding internal supply of the at least one internal supply respectively, to receive a corresponding first voltage of the at least one first voltage respectively, and each voltage sensor of the at least one voltage sensor is further connected to the reference voltage generation circuit and the reference voltage detection circuit, to receive the reference voltage and the indication signal;
each voltage sensor of the at least one voltage sensor is configured to output a first signal based on the reference voltage, the indication signal, and a received first voltage of the at least one first voltage;

if the indication signal indicates that the reference voltage is normal, the first signal is configured to indicate whether the received first voltage is within a preset voltage range based on the reference voltage and the indication signal, so as to generate voltage attack alarm;

if the indication signal indicates that the reference voltage is abnormal, the first signal is configured to indicate that the received first voltage is within the preset voltage range, so as to avoid false alarms;

wherein the power management unit is connected to the voltage attack detection circuit, and the voltage attack detection circuit is configured to detect whether a supply voltage of the power management unit is under voltage attack.

13. The chip according to claim 12, wherein a maximum value of the preset voltage range is less than a maximum working voltage of a bandgap voltage reference, and a minimum value of the preset voltage range is greater than a minimum working voltage of the bandgap voltage reference.

14. The chip according to claim 12, wherein the voltage attack detection circuit further comprises:

a deglitch circuit;

wherein the reference voltage detection circuit is connected to the at least one voltage sensor through the deglitch circuit respectively, the deglitch circuit is configured to reset a first indication signal of a duration less than or equal to a preset threshold to a second indication signal, the first indication signal is configured to indicate that the reference voltage is abnormal, and the second indication signal is configured to indicate that the reference voltage is not abnormal.

15. The chip according to claim 12, wherein the voltage attack detection circuit further comprises:

an external supply voltage sensor;

wherein the external supply voltage sensor is connected to the external supply, the external supply is configured to output a second voltage, the external supply voltage sensor is configured to receive the second voltage and the reference voltage and output a second signal, and the second signal is configured to indicate whether the second voltage is within the preset voltage range.

16. The chip according to claim 12, wherein each voltage regulation circuit of the at least one voltage regulation circuit comprises at least one of following elements: a low dropout regulator, a charge pump, a BUCK converter, a Boost converter and a bidirectional Direct current-Direct current converter.

17. The chip according to claim 12, wherein each voltage sensor of the at least one voltage sensor comprises a hysteresis comparator.

18. The chip according to claim 12, wherein the reference voltage is a bandgap voltage reference, wherein the bandgap voltage reference is a sum of a voltage proportional to temperature and a voltage inversely proportional to the temperature, and temperature coefficients of the two cancel each other to achieve a temperature-independent reference voltage.

19. The chip according to claim 12, wherein the reference voltage is a bandgap voltage reference, and the bandgap voltage reference is a direct current voltage that is independent from the supply and process and has a certain temperature characteristic.

20. The chip according to claim 13, wherein the external supply is used as a working voltage of the bandgap voltage reference.

* * * * *